Patented Feb. 10, 1931

1,791,832

UNITED STATES PATENT OFFICE

NOËL B. NEWTON, OF ACTON, LONDON, ENGLAND

SHOCK ABSORBER

No Drawing. Application filed September 1, 1928, Serial No. 303,607, and in Great Britain September 17, 1927.

This invention relates to hydraulic shock absorbers.

The action of hydraulic shock absorbers is well known to depend upon the resistance offered by a relatively non-compressible fluid to displacement through a restricted passage or passages.

It is obvious therefore that whether the shock absorber is of the rotary vane type or of the piston type, the fluid is an essential element of a mechanical combination of elements.

Castor oil is generally used as the fluid element in hydraulic shock absorbers in that it is self lubricating as well as having certain advantages due to its viscous properties. Oil, however, has a property of creeping which makes its retention a serious problem as any material loss of the fluid seriously affects the action of the shock absorber. Further, the oil is subject to oxidation which impairs its action.

The object of this invention is to overcome these difficulties.

According to the invention, the improved hydraulic shock absorber is characterized in that the fluid element comprises an emulsion of oil and water. Further features of the invention lie in the use of ingredients to lower the freezing temperature of such emulsion, and in the particular examples of suitable emulsions to be herein set out.

In one example of the invention the improved fluid for hydraulic shock absorbers comprises the following ingredients:—

| | |
|---|---|
| Water | 10 gallons |
| Pure lard oil | 2½ gallons |
| Sodium carbonate | 7 lbs. |
| Soft soap | 2 lbs. |

The emulsion is prepared by dissolving the emulsifying agents, namely the sodium carbonate and the soap in the water and then adding the oil and subjecting the whole to treatment in an emulsifier.

In another and preferred example the ingredients are as follows:—

| | Parts |
|---|---|
| Oleine | 3-5 |
| Methyl alcohol | 1 |
| Mineral oil .885 sp. gr | 19 |
| Glycerine | 1 |
| Potassium hydrate | 1 |
| Water | 75 |

The oleine and methyl alcohol are first mixed together cold and the mineral oil added slowly; the glycerine, potassium salt and water are mixed together placed in a high speed emulsifier, the oleine alcohol mixture added and agitated for 30 minutes. Colouring matter is preferably added to the mineral oil, but may be incorporated with the emulsion.

Other emulsifying agents than those given in the above examples may be employed, also other kinds of oils, but the above are given as suitable examples in which emulsification is easily obtained and such condition retained, and which produces a fluid found by trial to give satisfactory results.

In the second and preferred example the ingredients are chosen so that the emulsion shall have a low freezing point as well as the other desired qualities.

The chief advantage which the improved fluid provides is the ease with which it can be retained by glands in the shock absorber, in that, whereas oil tends to creep and leak out, the improved fluid appears to grease the surface of the parts and so provide lubrication, while at the same time the fluid of itself does not wet, or adhere to such parts, but tends to assume a spheroidal form and runs off them.

The improved fluid therefore while being relatively thin and watery as compared with the usual oil, has, contrary to what might be expected, properties which make it more easily retained than the thicker and less fluid oil, and is at the same time self-lubricating.

Other ingredients may be included in the emulsion for the purpose of lowering the freezing point, or for other purposes, the essential feature of the invention being the use of an emulsion of oil and water.

The fluid has been found to be easily retained in shock absorbers of the kind in which "hat leathers" are used as glands.

What I claim is:—

1. The process of absorbing shocks by transmitting the shock to a mobile liquid consisting of an oil and water emulsion.

2. The process of absorbing shocks by transmitting the shock to a mobile liquid consisting of an oil and water emulsion containing an agent for lowering the freezing temperature of the emulsion.

3. The process of absorbing shocks by transmitting the shock to a mobile liquid consisting of an oil and water emulsion made up of the ingredients in the proportions following:

| | |
|---|---|
| Water | 10 gallons |
| Pure lard oil | 2½ gallons |
| Sodium carbonate | 7 lbs. |
| Soft soap | 2 lbs. |

4. The process of absorbing shocks by transmitting the shock to a mobile liquid consisting of an oil and water emulsion made up of the ingredients in the proportions following:

| | Parts |
|---|---|
| Oleine | 3–5 |
| Methyl alcohol | 1 |
| Mineral oil .885 sp. gr. | 19 |
| Glycerine | 1 |
| Potassium hydrate | 1 |
| Water | 75 |

In testimony whereof I have signed my name to this specification.

NOËL B. NEWTON.